United States Patent [19]

Webster et al.

[11] 4,249,807
[45] Feb. 10, 1981

[54] COLOR PLOTTING DEVICE AND METHOD

[75] Inventors: Ronald B. Webster, Ellington; Ronald P. Larsen, Vernon, both of Conn.

[73] Assignee: The Gerber Scientific Instrument Company, South Windsor, Conn.

[21] Appl. No.: 38,452

[22] Filed: May 14, 1979

[51] Int. Cl.³ .............................................. G03B 41/00
[52] U.S. Cl. ......................................... 354/4; 355/32; 355/40
[58] Field of Search ................. 354/4; 355/40, 43, 50, 355/51, 53, 54, 32

[56] References Cited

U.S. PATENT DOCUMENTS

| 3,747,486 | 7/1973 | Herrmann et al. | 354/4 |
| 3,871,764 | 3/1975 | Nishizawa | 355/40 X |
| 3,903,527 | 9/1975 | Frehling | 354/4 |
| 4,123,763 | 10/1978 | Eadie et al. | 354/4 |

Primary Examiner—Richard A. Wintercorn
Attorney, Agent, or Firm—McCormick, Paulding & Huber

[57] ABSTRACT

A color plotter includes a photoexposure head that projects a beam of polychromatic light onto the photosensitive surface of a color film. The beam of light exposes a spot on the film surface and means are provided for moving the spot across the film surface in a controlled manner to generate a desired pattern or line. Color separation filters are mounted in the exposure head and a mechanism moves the respective filters into and out of the beam of light in accordance with a desired color in the plot. A density selector is also provided to control the degree of film exposure and the resulting color density. The color plotter is capable of producing maps, drawings and other graphic material in multiple colors on the exposed film.

30 Claims, 6 Drawing Figures

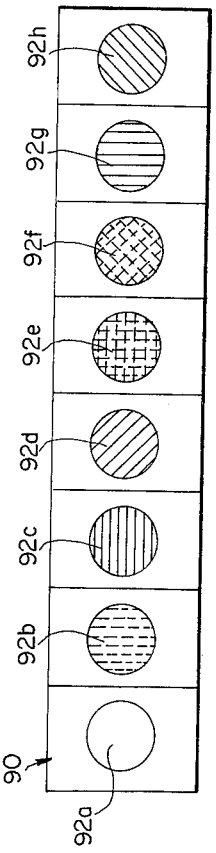
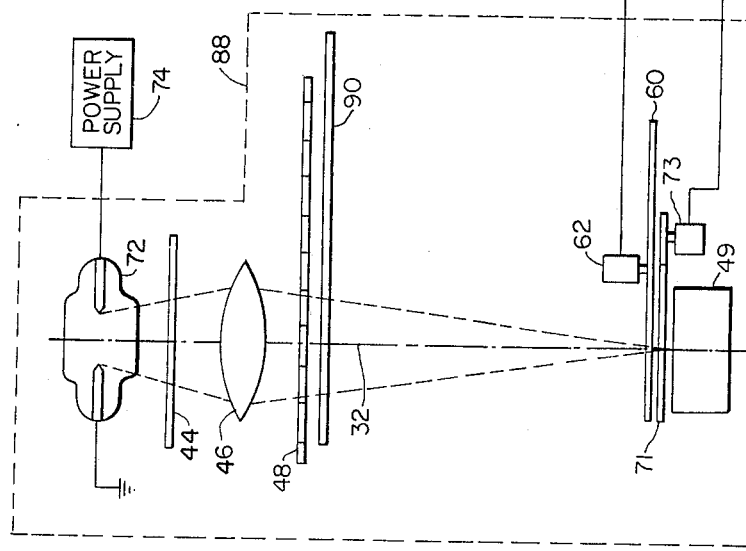

COLOR PLOTTING DEVICE AND METHOD

BACKGROUND OF THE INVENTION

The present invention relates to the field of plotting equipment and is concerned more particularly with a color plotter that produces colored images by means of photoexposure techniques.

Automatically controlled plotting equipment is well-known in the art. Such equipment utilizes an instrument such as a drawing pen, and by means of accurately-guided carriage motions translates the instrument relative to a plotting paper or other material in response to programmed command signals to generate an accurate plot of information represented by the signals.

One such plotting instrument disclosed in U.S. Pat. No. 3,330,182, having the same assignee as the present invention, utilizes a photoexposure head that projects a beam of light onto the photosensitive surface of a film. The beam illuminates a spot on the film surface, and by moving the photohead and the spot, the film is exposed along a defined path or plot. When the film is developed a visual representation of the plot is obtained.

A plotting operation as described above may be used to generate drawings, facsimiles of printed circuit boards and other such graphic information. While many such products are adequately defined in black and white, it is desirable in the case of maps, for example, to represent different features by means of different colors. In the past, multicolored maps have been generated from plotters by producing one black and white plot for each color that appears in the map, and then generating printing plates for each such color by conventional photoengraving processes. The plots for each color were individually generated from digitized data and the final product with its various colors was not observable until after the printing process was complete. A direct plot of the map in its various colors is desirable at an earlier stage of development.

Printed circuitboards and integrated circuit chips that consist of multiple layers of conductive, semiconductive and insulating materials are manufactured by photo-resistive plating and etching processes. Drawings or masters used to define the configuration of masks that are employed in generating the various layers of an electrical circuit by these techniques are accurately drawn by computer controlled plotters and are drawn at large scale for proofing purposes before they are reduced to working size. Proofing of the masters for continuity, isolation and registration of the various layers is currently performed by generating transparencies of the circuits in each layer in different colors or in black and white, and then overlaying the transparencies for adjacent layers to examine the registration or isolation of the circuit elements. Color transparencies are preferred to black and white transparencies since the registration or isolation of overlying areas is easier to observe. For example, where two different colors are used to define the electrical components on adjacent layers, the overlapping colors produce a third color that can be readily ascertained by examination. Such color transparencies are currently produced from black and white plots of the masters in a dye process. This process introduces a number of intervening steps between the generation of a black and white plot by an automatically controlled plotter and the final step that yields the color transparencies.

A more rapid proofing of the masks could be obtained if various levels of the circuits could be plotted as a single color composite on photosensitive color film. In such a composite the electrical components of adjacent layers would be represented by different colors, and overlapping portions of the components would be readily identified by a third color that is generated by the combination of colors used to identify each layer.

Still further, with a color plotter, computer generated stereoscopic images of a three dimensional drawing could be plotted on a single piece of sheet material with each image represented in a different one of two complementary colors. When such a drawing is viewed in a stereoscope having appropriate color filters that respectively obliterate the other of the two stereo images, a three dimensional impression of the drawing is obtained.

Accordingly, it is a general object of the present invention to provide a color plotter that offers the capability of generating on a single sheet of material plots in one or a plurality of colors. In addition to the color dimension, it is a further object of the invention to add the dimension of density or shade to plots produced by a plotting apparatus.

SUMMARY OF THE INVENTION

The present invention resides in a color plotter that has the ability of generating plots in one or a plurality of colors on a single sheet of photosensitive material.

The plotter includes support means which defines a work surface for holding a color film in a photographically exposable condition. In this respect color film includes all types of color film including color reversal film commonly marketed under trade names having a suffix -chrome and color negative film commonly marketed under trade names having a suffix -color. Additionally, the term "film" is intended to include flexible materials and rigid plates bearing layers of photosensitive material that develop color images upon exposure with or without subsequent development and printing.

The plotter further includes a light projecting means for producing a beam of polychromatic light and projecting that beam as a spot onto the film held on the work surface of the support means. Color filtering means positioned in the path of the polychromatic light beam adjust the color of the light spot projected on the film and thereby control the resulting color of the plot. Exposure adjusting means are positioned in the light beam or electronically adjust the degree of film exposure and the resulting color density.

Displacement means connected with the support means and the light projecting means controllably move the colored light spot and film relative to one another. For example, the support means such as a table may be displaced relative to the light projecting means so that the film positioned on the work surface moves relative to the light beam to expose the color film along a line traced by the colored spot and records a color plot of the line.

BRIEF DESCRIPTION OF THE DRAWINGS

FIG. 5 is a schematic illustration of the color plotter of the present invention in still another embodiment.

FIG. 6 is a plan view of the linear color slide utilized in the color plotter in FIG. 5.

DESCRIPTION OF THE PREFERRED EMBODIMENTS

Figure 1:
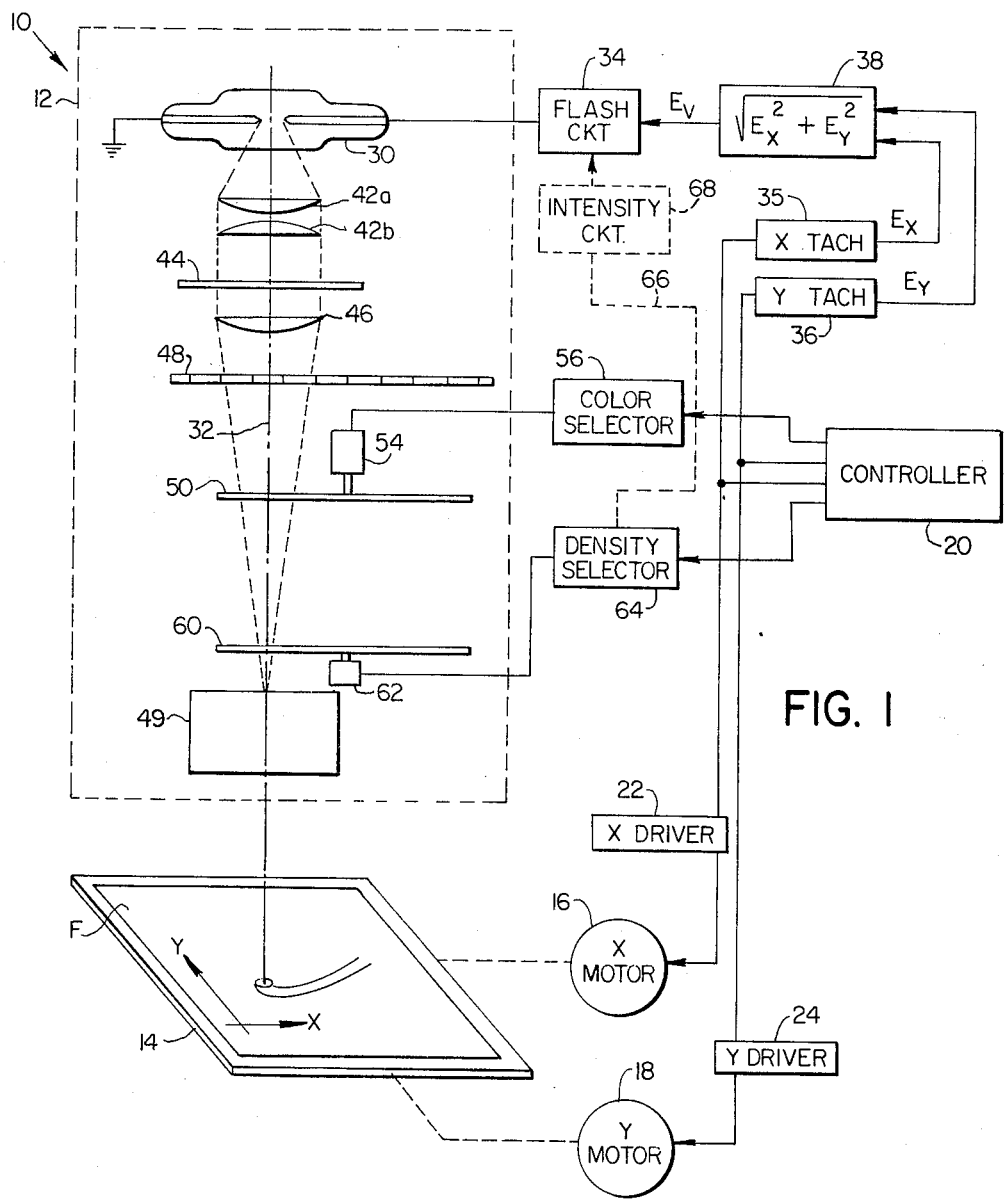
FIG. 1 is a schematic illustration of the color plotter of the present invention in one embodiment.

FIG. 1 illustrated one embodiment of an automatically controlled color plotter, generally designated 10, having a photoexposure of photohead 12 with optical means for projecting a beam of polychromatic light from the head onto the photosensitive surface of a film F. The film F is fixedly positioned on the flat work surface of a movable table 14 under the photohead 12. The table with the film is movable relative to the photohead 12 in the illustrated X coordinate direction by means of an X-drive motor 16 interposed between the head and the table. Similarly, the table is moved relative to the head in the illustrated Y coordinate direction by means of a Y-drive motor 18. The X- and Y-motions are determined by a plotting program that is stored in the master controller 20 for the color plotter. During a plotting operation, the controller reads the program and generates either analog or digital motor command signals that are transmitted to the respective motors 16 and 18 by means of an X-motor driver 22 and a Y-driver 24.

Of course, it should be recognized that the relative movement of the photohead and the film F could also be generated by moving the photohead while the film and table 14 are held stationary. Also, the head could be moved in one coordinate direction relative to the table while the table and film are moved in the other coordinate direction. Each of the above described motion generating means results in relative movement of the film F and the spot of light on the photosensitive surface of the film at the point of beam impingement. The line trace or path traversed by the light spot exposes the film and produces a photographic record of the trace either directly or by means of photographic development processes appropriate for the particular film being used. It will also be understood that a plotting operation must be carried out in a dark or low light level environment in order to prevent exposure of the film in areas other than those illuminated by the light spot. Here the term "dark" or "low light level" conditions are intended to include conditions in which the ambient light consists only of wavelengths to which the particular film under consideration is not sensitive.

In the illustrated plotter 10 the photohead 12 includes a light source 30 from which the beam is projected along an optical axis 32 between the source and the work table 14. The illustrated source is a xenon lamp that is periodically excited by means of a flash circuit 34. The flash circuit is in turn controlled by means of the motor command signals that are transmitted to the X- and Y-drive motors 16 and 18 from the controller 20. The same commands are processed respectively by means of an X-tachometer circuit 35 and a Y-tachometer circuit 36 to determine the relative velocity between the film and the spot of light in both coordinate directions. The output signals Ex and Ey of the circuits 35 and 36 represent the respective velocities and are transmitted to a computing circuit 38 which calculates the total relative velocity in accordance with the Pythagorean theorem. The total velocity signal Ev from the computing circuit 38 is supplied to the flash circuit 34 and is employed to control the rate at which the xenon lamp is flashed.

By controlling the flashing rate in accordance with the speed of relative movement of the light spot on the film F, a desired intensity or uniform exposure standard is obtained along the line traced or plotted by the light spot. For example, if the relative movement increases, a corresponding increase in the flash rate ensues in order to expose the film by the same amount at each point along the plotted line. Of course, increased flashing rates at the same speed will produce greater exposure and decreased flashing rates, decreased exposure. For a more complete description of the flashing circuit and associated controls, reference may be had to copending application Ser. No. 864,601 filed Dec. 27, 1977, in the names of Leonard G. Rich and Henry F. Berdat.

Light emanating from the source 30 is directed along the beam axis 32 through condensing lenses 42a and 42b and then through a color compensating filter or filters 44. Since most artificial light sources do not produce a color balanced light, that is a light of uniform intensity throughout the color spectrum, photographic images produced by the light are not color balanced, that is, certain colors will dominate and other colors will be suppressed with the overall result being an untrue color picture. For this reason the compensating filter 44 is interposed in the light beam and is provided with spectral transmission characteristics that tend to produce a more even distribution of the color wavelengths emitted by the source 30.

The balanced, polychromatic light beam then passes through a converging lens 46 and, while still diffused, through an aperture slide 48. The aperture slide includes a plurality of apertures positioned in side-by-side relationship for movement individually into the light beam so that spots or images of corresponding size and shape can be projected onto the photosensitive surface of the film through an objective lens 49. The plate 48 may be indexed relative to the optical axis 32 to position a selected aperture in the beam, and one means for indexing such plate that employs the relative movement of the photohead 12 and plotting table 14 is described in greater detail in copending U.S. application Ser. No. 833, 374 filed Sept. 14, 1977 now U.S. Pat. No. 4,129,264, by Wood and Alford having the same assignee. Each of the apertures on the slide may be accompanied by a normalizing filter that balances the amount of light falling on the film from the various apertures.

In accordance with the present invention a color filter disc 50 is mounted adjacent the beam axis 32 and as close as possible to the aperture plate 48. The color disc, shown in greater detail in FIG. 2, includes a plurality of color separation filters 52a–52h that are arranged in a circular array at the periphery of the disc. The separation filters have different spectral transmission characteristics associated with given wavelengths in the visible light spectrum and therefore transmit given colors in the polychromatic beam of light.

As shown in FIG. 1, the disc is mounted on the drive shaft of a small servo motor 54 so that the periphery of the disc containing the filters lies within the light beam from the source 30. The servo motor 54 rotates the disc about its central axis and positions the respective separation filters individually in registration with the beam axis 32 to thereby adjust the color of the light spot on the film surface. With separation filters of different spectral transmission characteristics and by appropriate actuation of the servo motor 54, the plots produced by the photohead on the color film F may be generated with any of the colors established by the filters 52b–52h on the filter disc 50. The dominant colors transmitted by the filters may be selected from any portion of the color spectrum and it is desirable to include a position such as 52a in the disc with no filter so that black or white images may also be plotted in the same manner as a conventional photoplotter described in U.S. Pat. No. 3,330,182.

The color selector 56 controls the operation of the servo motor 54 in response to command signals received from the master controller 20. Accordingly, the desired color of a particular plotted line is recorded in the controller along with data defining the geometric configuration of the line so that colors may be selected and changed in a completely automatic plotting process.

A neutral density filter disc 60 is also imposed in the light beam between the color filter disc 50 and the objective lens 49. The filter disc 60 may consist of a plurality of discrete filters each of which has a different neutral density from the others so that the intensity of the light passing through the disc 60 is attenuated accordingly. The filters may be distributed in a circular array similar to the color separation filters shown in FIG. 2.

Figure 3:
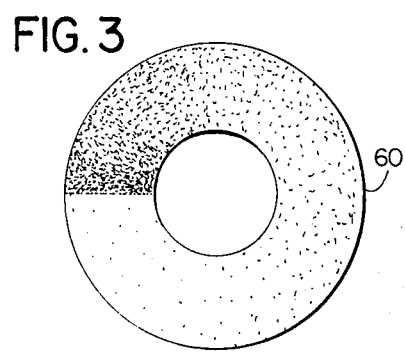
FIG. 3 illustrates a variable density neutral filter employed in the color plotter of FIG. 1.

Preferably, however, the filter disc 60 is comprised by a single neutral density filter in the form of a circular disc shown in FIG. 3 having light attenuating characteristics which vary circumaxially about the disc. Such a disc is described in greater detail in the referenced U.S. Pat. No. 3,330,182. By mounting the disc adjacent to the light beam for rotation of the disc periphery through the beam, the amount of light passing to the color film and, correspondingly, the intensity of the colored light from the color filter disc 50 can be controlled. For this purpose the disc 60 is mounted for rotation by means of another small servo motor 62 that is controlled by a density selector circuit 64 in response to commands received from the controller 20. Not only the color of the light spot on the film but also the intensity of the spot may be recorded in the plotting data so that both color and density or saturation of the resulting plot may be controlled automatically during the plotting process.

In a further embodiment of the color plotter shown in FIG. 1, the variable density filter 60 and its associated servo motor 62 may be replaced by means of a control link 66 (shown in phantom) between the density selector circuit 64 and the flash circuit 34. In this embodiment, the density of the color plot is controlled by an intensity control circuit 68 connected to the flash circuit 34. The intensity circuit adjusts the discharge current through the xenon lamp during each flash of the lamp caused by the flash circuit 34, and the intensity of the flash is correspondingly adjusted. By increasing the flash intensity, the exposure of the color film F by the light from the color disc 50 is increased and the density of the color exposure on the film changes correspondingly. A decrease of the flash intensity by the circuit 68 provides the opposite change in color density. The same effect can also be achieved by adjusting the flash circuit 34 to change the flash rate or the number of flashes per unit length of a line plot rather than the flash intensity.

Figure 4:
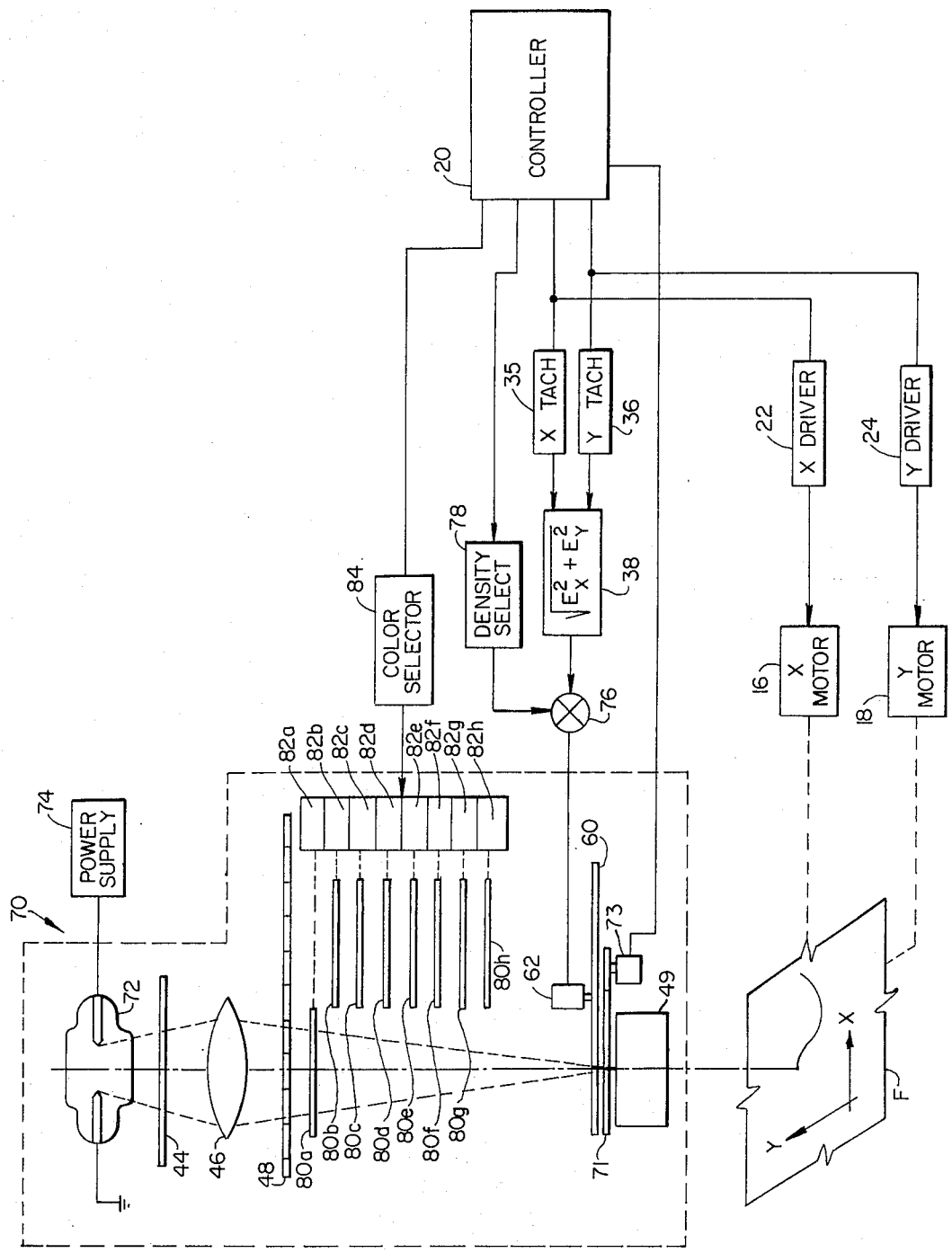
FIG. 4 is a schematic illustration of the color plotter of the present invention in another embodiment.

A color plotter, generally designated 70, illustrating a further embodiment of the present invention is shown in FIG. 4. Components of the plotter 70 which have previously been described in connection with the plotter 10 illustrated in FIG. 1 bear the same reference numerals.

In the color plotter 70 of FIG. 4 the light source 72 is a mercury arc lamp that is energized by means of a power supply 74 to produce a fixed intensity beam of polychromatic light during a plotting operation.

Light from the source 72 passes through the color correction filter 44, the converging lens 46, the aperture plate 48 and the variable density filter 60. The objective lens 49 then focuses the real image of the aperture in the plate 48 sharply on the light sensitive surface of the color film F.

An iris or other type shutter 71 actuated between open and closed conditions by a solenoid 73 is mounted immediately above the objective lens 49 to interrupt the light beam falling on the film during intervals when no exposure of the film is desired. This situation can occur when the head and film are at a standstill or when the photohead and film are moved relative to one another but no line plot is desired. The solenoid 73 is operated by the controller 20 in accordance with a plotting program to control film exposure just as other plotting parameters such as displacement, speed, intensity and color.

Between the aperture plate 48 and the variable density filter 60 the light beam passes adjacent a pack of color separation filters 80a–80h. The filters are mounted for pivotal or translational movement into and out of the beam of polychromatic light by means of a corresponding plurality of individual actuating solenoids 82a–82h illustrated schematically. An actuating device of this type is disclosed in greater detail in U.S. Pat. No. 4,056,317.

A color selector circuit 84 is connected with the actuating solenoids, and in response to command signals from the controller 20 causes the solenoids to move the individual color separation filters into or out of the beam of light from the source 72. The color of the spot on the recording film is thus changed and the color emulsions on the films are exposed correspondingly. If desired, more than one separation filter may be inserted into the light beam at the same time in order to mix the colors of various filters. If the filters all consist of the three subtractive primary colors, cyan, magenta and yellow, in different density ranges, a broad spectrum of colors at different densities can be generated by combinations of the filters. Since all of the filters may be held out of the light beam, it is not necessary to provide a clear filter as suggested in connection with the color disc 50 in the embodiment of the FIG. 1.

The intensity of the beam of light reaching the film F is also controlled by the variable density filter 60 such as shown in FIG. 3. The filter 60 is rotated by the servomotor 62 in response to control signals applied to a summing junction 76 from both a color density selecting circuit 78 and the computing circuit 38 which receives velocity signals from the tachometers 35, 36. The composite velocity signal from the circuit 38 adjusts the beam intensity to provide a predetermined film exposure at various plotting speeds as in the embodiment of FIG. 1. The density selecting circuit 78 increases or decreases the predetermined film exposure set by the computing circuit in accordance with programmed intensity signals recorded in the controller 20.

In effect, the density selecting circuit 78 performs basically the same function as the density selector circuit 64 in the plotter 10 to control the density of the color in the finished plot. Thus, the adjustment of beam intensity at the film surface for a programmed color density at any plotting speed is accomplished by means of the one variable density filter 60 and the control circuits 38 and 78. If the color densities exposed on the film are adequately modified at discrete levels by the filters 80a–80h in the pack without need for fine adjustment by the variable density filter 60, the density selector circuit 78 may be eliminated.

Figure 2:
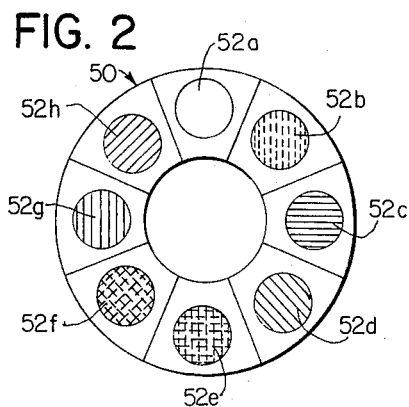
FIG. 2 illustrates a color filter disc employed in the plotter of FIG. 1.

In still a further embodiment of the color plotter shown in FIG. 5 the color filter disc 50 in FIGS. 1 and 2 or the color filter pack in FIG. 4 is replaced in the photohead 88 by a linear color filter slide 90. Otherwise, the components are the same and bear the same reference numerals as in the plotter in FIG. 4.

The linear color filter slide 90 is shown in detail in FIG. 6 and is structurally similar to the aperture slide 48 in FIG. 1 except that the slide 90 carries a plurality of color separation filters 92b–h positioned linearly along the slide. The slide 90 is mounted in the photohead 88 along the beam axis 32 between the converging lens 46 and the variable density filter 60 so that one of the color separation filters 92b–h coincides with the beam axis and establishes the color of the light spot produced by the beam on the film F. At the end position 92a of the slide 90, no filter is provided so that a black or white plot can be produced if desired.

Individual color filters 92b–h on the slide 90 or the end position 92a are positioned in registration with the beam axis by indexing the slide laterally of the beam and relative to the photohead 88. Such indexing can be produced by a servomotor in the head or by moving the head while one end of the slide is abutting a stationary stop as described in the above referenced U.S. application Ser. No. 833,374, now U.S. Pat. No. 4,129,264. The indexing operation is generally carried out when a line plot has been completed and a color change is desired. When the line plot is completed, the power supply 74 is turned off or preferably the shutter 71 is closed to prevent the film from being further exposed. Indexing of the color slide takes place and then plotting is resumed by slewing the optical axis 32 to the next plotting point and turning the power supply 74 on or opening the shutter 71.

While the present invention has been described in several preferred embodiments, it should be understood that numerous modifications and substitutions can be had without departing from the spirit of the invention. For example, the plotters disclosed are generally denominated table plotters in which the film is spread on a flat surface and the relative movement of the film and the spot of light occurs in a flat and generally horizontal plane. However, the invention also is applicable to drum plotters in which the film is held by vacuum or other means on the cylindrical surface of a drum that rotates relative to a photoexposure head. The color films employed generally include a plurality of color sensitive emulsions spread on either a flexible or rigid substrate to form a photographic plate.

In addition to controlling the intensity of the light source, the density of the color exposure may be controlled with the variable density filter and other light attenuating devices such as an iris-type aperture control found in many cameras. Incandescent lamps may be employed as light source in plotters such as shown in FIG. 4 where the source operates at a uniform intensity level; however, incandescent lamps are not suitable in plotters which vary the light intensity to control film exposure because the light from such lamps changes its spectral composition at different power levels and, therefore, a complex color correction system would be required. The various color plotting operations may be carried out in different fashions. All plots of one color may be completed before the plots of another color are started or the machine may readily switch between the various colors as given regions of the film are exposed.

Accordingly, the present invention has been described in several preferred embodiments by way of illustration rather than limitation.

We claim:

1. A color plotter comprising:
   support means defining a work surface for holding in a photographically exposable condition a color film discriminately photosensitive to light of different colors in order to record a plot in the film in multiple colors:
   light projecting means for producing a beam of polychromatic light and projecting the beam as a spot onto film held on the work surface of the support means;
   color filtering means positioned in the path of the polychromatic light beam of the projecting means for adjusting the color of the light spot projected on the film, the color filtering means including a plurality of color separation filters of different spectral transmission characteristics and means for moving the filters respectively and selectively into and out of the polychromatic beam of light to thereby change the color of the light spot on the film and the color recorded in the film; and
   displacement means connected with the support means and the light projecting means for controllably moving the colored light spot and film relative to one another and thereby expose the color film with the light spot in different colors at different locations to record a plot in multiple colors.

2. A color plotter as defined in claim 1 wherein the color separation filters are mounted in a circular array and the means for moving the filters comprises rotating means for rotating the array to bring the filters individually into the polychromatic light beam.

3. A color plotter as defined in claim 1 wherein the color separation filters are mounted in a filter pack adjacent the beam of light; and the means for moving the filters comprises means for moving the respective filters into and out of the light beam from the pack.

4. A color plotter as defined in claim 1 wherein the light projecting means includes a light source; and means are provided for adjusting the exposure of the color film by the light source and thereby adjust the color density of the plots.

5. A color plotter as defined in claim 4 wherein the exposure adjusting means comprises a variable density filter positioned in the light beam between the light source and the film.

6. A color plotter as defined in claim 4 wherein the exposure adjusting means comprises means for flashing the light source in the projecting means at controlled intensities.

7. A color plotter as defined in claim 4 wherein the means for adjusting the exposure of the film comprises means for adjusting the intensity of the light source in the projecting means.

8. A color plotter as defined in claim 1 wherein the projecting means further includes aperture means positioned in the light beam for establishing the size of the spot exposed on the film.

9. In a plotter device having a photoexposure head with optical means for projecting a beam of light from the head onto the surface of a photosensitive film to expose a spot on the film surface, and means for moving the spot of light across the surface of the film in a controlled manner to selectively expose the film and generate a desired plot, the improvement for exposing a photosensitive color film comprising: adjustable chromatic separation means mounted in the photoexposure head and cooperating with the optical means to vary the spectral composition of the light beam and produce different dominant colors in the beam projected on the photosensitive surface of the color film at correspondingly different locations; and controlled means for adjusting the chromatic separation means to selectively change the dominant color in the beam and vary the color of the plot exposed at one location on the color film from the color exposed at another location.

10. In a color plotting device, the improvement of claim 9 wherein the chromatic separation means comprises a plurality of color separation filters mounted adjacent the periphery of a rotatable disc in the photoexposure head; and the controlled means for adjusting the chromatic separation means includes means for rotating the disc through the light beam to position individual separation filters in the beam and vary the color in the beam.

11. In a color plotting device, the improvement of claim 9 wherein the chromatic separation means comprises a filter pack having a plurality of color separation filters mounted in the pack adjacent the light beam; and the controlled means for adjusting the chromatic separation means comprises means for moving the filters respectively from the pack and into the light beam.

12. In a color plotting device, the improvement of claim 9 wherein the chromatic separation means comprises a slide positioned in the photoexposure head and having a plurality of color separation filters located on the slide in a linear array; and the controlled means for adjusting comprises means for moving the slide to position the filters individually in and out of the beam of light to change the color of the light beam projected onto the photosensitive surface of the film.

13. A color plotter as defined in claim 1 wherein the color filtering means comprises a linear slide positioned in intersecting relationship with the polychromatic light beam and movable transversely through the beam, the slide including a plurality of color separation filters distributed along the linear slide for positioning in the light beam.

14. In a color plotting device, the improvement of claim 9 further including means in the photoexposure head for varying the intensity of the colored light beam projected onto the photosensitive surface of the color film to thereby vary the density of the color plotted on the film.

15. In a color plotting device, the improvement of claim 14 further including density selecting means for generating a signal representative of a desired color density in the color plot, and velocity signal generating means for generating a signal representative of the relative velocity of the spot on the film; and the intensity varying means is responsive to both of the signals from the density selecting means and the velocity signal generating means.

16. A color plotter as defined in claim 1 wherein the color filtering means comprises a plurality of color separation filters mounted adjacent the polychromatic light beam and movable individually or in various combinations into the beam, the color filters of the plurality consisting entirely of filters for the three subtractive primary colors.

17. A color plotter as defined in claim 16 wherein the color filters include filters of various densities for the three subtractive colors.

18. A color plotter as defined in claim 4 wherein the means for adjusting exposure of the film comprises means for flashing the light source in the projecting means at variable rates.

19. A plotter having a photoexposure head for producing color plots from a color film exposed by the head comprising:
means for moving the photoexposure head and the color film relative to one another in controlled relationship from one relative position to another;
light means mounted within the photoexposure head for generating a beam of colored light in selected colors;
optical means within the photoexposure head for projecting the beam of colored light along an axis from the head onto the color film at the one and the other positions to record a color exposed on the color film; and
color selection means connected with the light means for changing the color of the light beam projected on the film to record different colors exposed on the color film at the one and the other positions.

20. A plotter for producing color plots as defined in claim 19 wherein the light means for generating a beam of light in selected colors includes a source of polychromatic light and color filtering means disposed along the light beam to vary the color of light in the beam.

21. A plotter for producing colored plots as defined in claim 19 further including means for adjusting the degree of film exposure caused by the beam of colored light projected on the film.

22. A plotter for producing color plots as defined in claim 19 further including means in the photoexposure head for selectively interrupting the projected beam of light before the beam reaches the color film.

23. A plotter for producing color plots as defined in claim 19 wherein the light means includes a xenon lamp and means for flashing the lamp at variable rates to control film exposure.

24. A plotter for producing color plots as defined in claim 19 wherein the light means includes adjustable aperture means for varying the size of the colored light beam projected onto the film.

25. A method of generating a plot in different colors comprising:
providing a color film having a surface photosensitive to light of different colors and capable of recording and reproducing with discrimination images in different colors;
generating a beam of light and directing the beam onto the photosensitive surface of the color film to expose the film;
moving the beam of light from one location of the photosensitive surface to another to expose images of a plot on the surface at different locations; and
changing the color of the beam of light between the exposure of the film at the one location and the other to record images of the plot in the film in different colors at the different locations.

26. A method of generating a plot as defined in claim 25 wherein the step of generating a beam of light comprises generating a beam of polychromatic light; and the step of changing the color of the beam of light comprises inserting in the beam of polychromatic light a color separation filter to remove from the polychromatic beam selected colors of light before the beam reaches the photosensitive surface of the color film.

27. A method of generating a plot as defined in claim 25 further including the step of controlling the degree of exposure of the photosensitive surface of the color film by the beam of light.

28. A method of generating a plot as defined in claim 27 wherein the step of controlling comprises inserting a variable density filter in the beam of light for attenuating the intensity of the beam.

29. A method of generating a plot as defined in claim 27 wherein:
 the step of generating a beam of light comprises providing a light source and optically projecting the beam from the source; and
 the step of controlling the degree of exposure comprises controlling the amount of light generated by the source.

30. A method of generating a plot as defined in claim 29 wherein the step of controlling the amount of light comprises flashing the light source at a controlled and variable rate.

* * * * *